Figure 1:
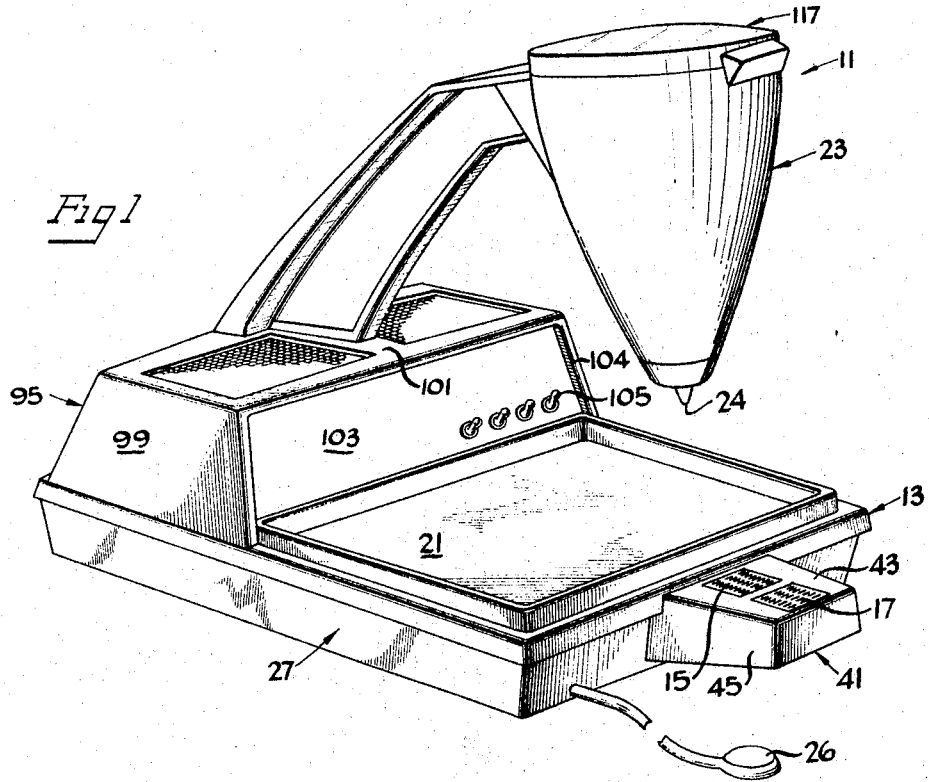

May 16, 1967 J. B. McCORMICK 3,319,289
APPARATUS FOR MOUNTING A SPECIMEN
Filed May 20, 1963 3 Sheets-Sheet 1

INVENTOR.
James B. McCormick
BY
Anderson, Luedeka, Fitch, Even & Tabin
ATTORNEYS

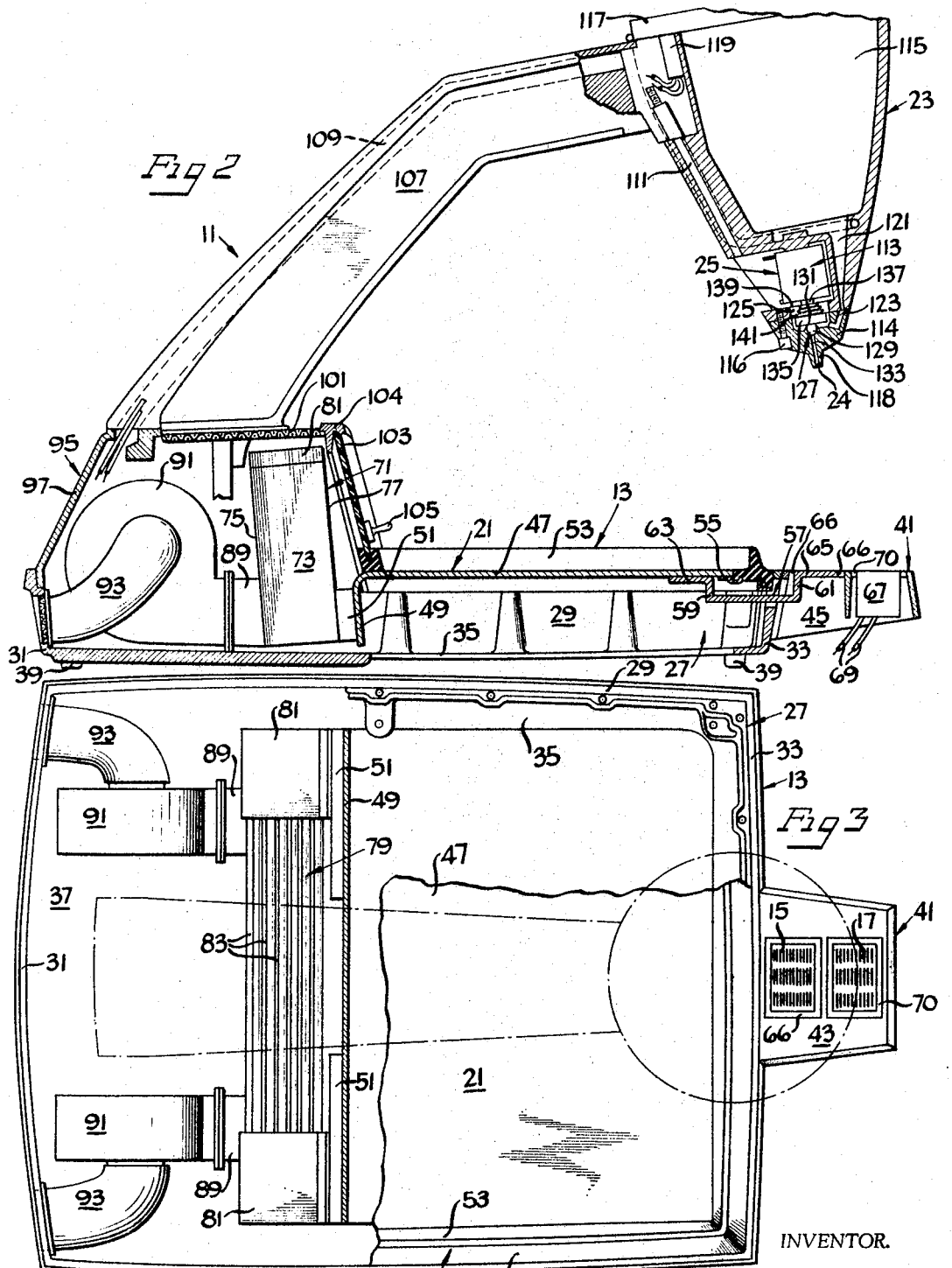

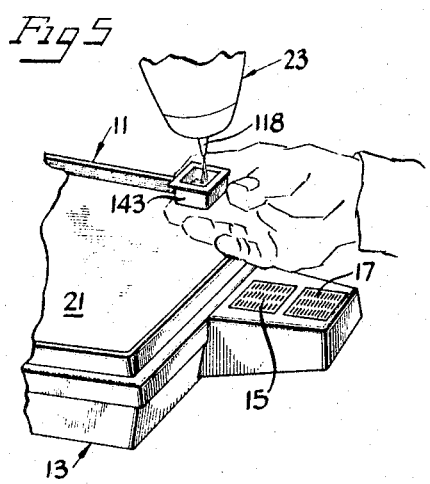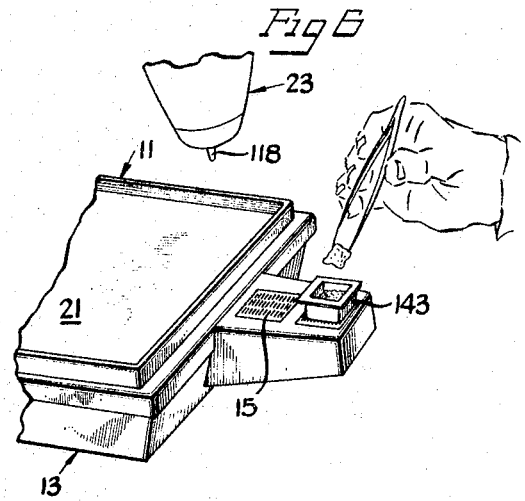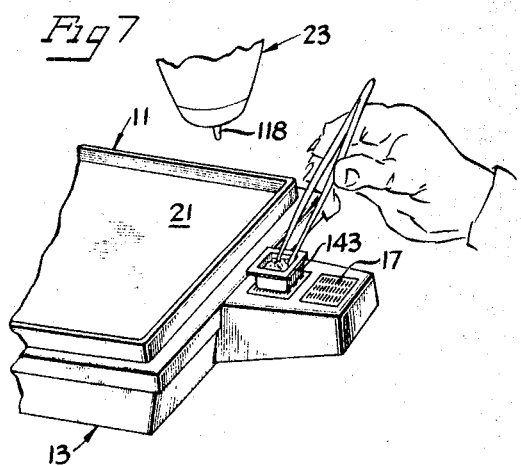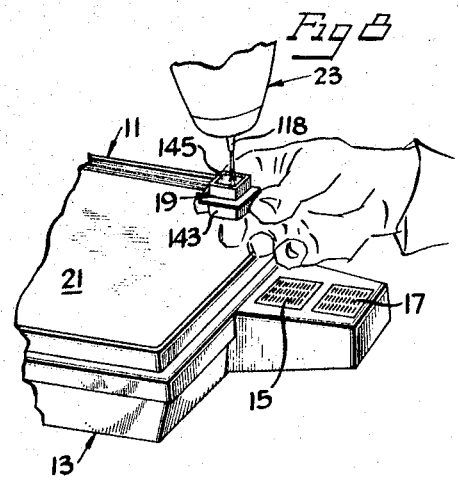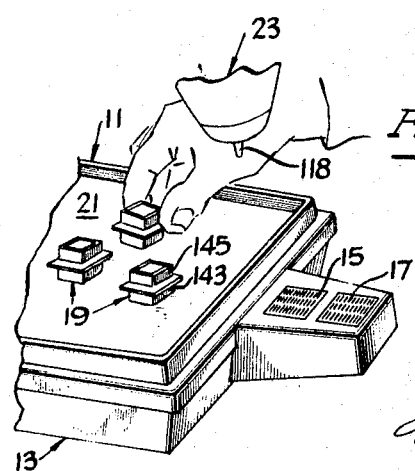

United States Patent Office 3,319,289
Patented May 16, 1967

3,319,289
APPARATUS FOR MOUNTING A SPECIMEN
James B. McCormick, La Grange, Ill., assignor, by mesne assignments, to Miles Laboratories, Inc., Elkhart, Ind., a corporation of Indiana
Filed May 20, 1963, Ser. No. 281,649
5 Claims. (Cl. 18—5)

This invention relates to the preparation of specimens for sectioning on a microtome or the like. More particularly, the invention relates to apparatus utilized in the embedding of a specimen in a solidified thermoplastic material.

A conventional method of preparing a specimen for sectioning on a microtome involves the embedding of the specimen in a solidified thermoplastic material such as paraffin, the thermoplastic material being preferably formed into a block which is of such a size that it can conveniently be placed in the chuck of a microtome. In one form of the practice of this method, a paraffin is placed in some form of container which is heated on a hot plate or over a gas flame until the paraffin has melted. The paraffin is then poured into a hollow mold such as an embedding box in which the specimen is disposed or in which the specimen is subsequently placed. The mold is then placed in a tray filled with ice water for approximately 10 minutes or until the paraffin has solidified, whereupon the paraffin and specimen are removed from the mold.

Frequently, especially when the specimen consists of human tissue, it is desirable that the specimen be oriented in a particular manner within the mold so that the section sliced therefrom on the microtome will be taken along a plane parallel to a particular plane passing through the specimen. However, the specimen may not be stable in the desired position of orientation, and it may be necessary for a technician to support the specimen in such a position, as with forceps, until the paraffin has partially solidified. This initial solidification of the paraffin may take several minutes using an ice bath as a coolant, during which time the precise disposition of the specimen must be maintained. If, after the paraffin has solidified, it is found that the specimen is not properly orientated, there is no convenient means available for returning the paraffin to a liquid state to permit reorientation.

Accordingly, the presently used method of mounting a specimen in paraffin, while satisfactory, has certain inadequacies. The various devices and instruments utilized by the technician occupy a considerable amount of bench space in the laboratory. Also, the solidification of the paraffin by means of the ice tray is relatively slow and, when it is necessary for the technician to support the specimen with forceps while the solidification of the paraffin is initiated, a considerable amount of the technician's time is consumed. Finally, and as has already been mentioned, there is no convenient means for liquefying the paraffin so that the specimen may be reoriented if, after the paraffin has solidified, it is found that the orientation is not satisfactory.

The principal object of the present invention is to provide a compact apparatus for facilitating the mounting of specimens in a thermoplastic material.

Another object of the invention is to provide an apparatus which is adapted to rapidly solidify a liquefied thermoplastic material contained in a mold.

A further object of the invention is to provide such an apparatus which is adapted to liquefy a thermoplastic material contained within a mold after it has become at least partially solidified so as to permit reorientation of a specimen disposed therein.

A still further object of the invention is to provide a compact apparatus which is adapted to contain and dispense a quantity of liquid thermoplastic material and to effect rapid solidification of the material within a mold as well as a reliquefaction of partially solidified material if desired.

Other objects and advantages of the invention will become apparent with reference to the following description and the accompanying drawings.

Figure 4:
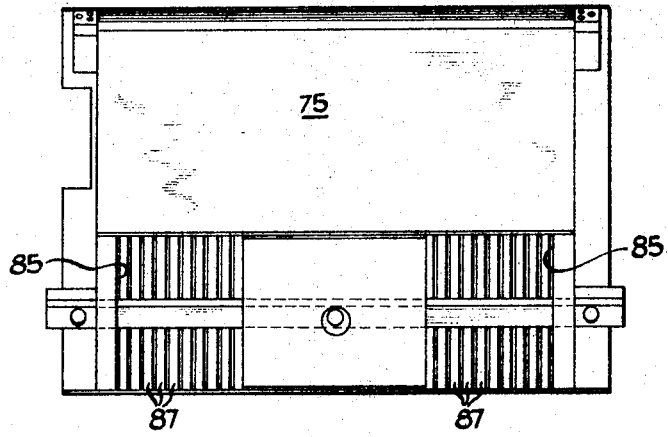

In the drawings:
FIGURE 1 is a perspective view of an apparatus showing various of the features of the invention;
FIGURE 2 is a broken-away fragmentary elevational view, partially in section, of the apparatus of FIGURE 1;
FIGURE 3 is a partially broken-away fragmentary plan view of the apparatus of FIGURE 2;
FIGURE 4 is an elevational view of a portion of the apparatus shown in FIGURES 2 and 3; and
FIGURES 5 through 9 are diagrammatical views illustrating a method in which the apparatus of FIGURE 1 may be utilized.

Very generally, the apparatus 11 of the illustrated embodiment is of a compact design adapted to rest upon a table or work bench in a laboratory and comprises a base 13 defining a pair of adjacent relatively small temperature-regulated surfaces 15 and 17 upon each of which a mold 19 can be supported. One of the surfaces 15 is chilled so as to facilitate initial solidification of paraffin in the mold 19, and the other of the surfaces 17 is heated to facilitate the reliquefaction of partially solidified paraffin should such reliquefaction be desired, as when it is necessary to reorient the specimen after the paraffin has become partially solidified. The base 13 also defines a larger chilled surface 21 adapted to receive and support a plurality of the molds 19 after the solidification of the paraffin therein has been initiated and the orientation of the specimen is considered to be satisfactory.

Suspended above the base 13 is a hollow receptacle 23 which is adapted to contain a quantity of paraffin, and which is heated so as to maintain the paraffin in a liquid state. The receptacle 23 includes a dispensing orifice 24 controlled by a valve 25, the valve 25 being operated by a foot switch 26 so as to permit the hands of the technician to be free for the manipulation of the molds.

More specifically, the base 13 of the illustrated embodiment comprises a generally rectangular border frame 27 having side walls 29, a rear wall 31, and a front wall 33. The forward portion of the frame does not include a bottom wall, but the lower edges of the side and front walls thereof are provided with an inwardly directed horizontally disposed flange 35 (FIGS. 2 and 3) which may, if desired, be used to support an insulation (not shown). The rearward portion of the frame is provided with a bottom wall 37 which is integral with the rear and side walls and which supports certain of the operating components of the apparatus. Table-engaging pads 39 are secured to the lower surfaces of the flanges 35 of each of the side walls 29 at their intersection with the flanges of the front wall 33, and similar pads are secured to the bottom wall of the rearward portion of the base adjacent the rearward edge thereof.

Projecting from the front wall 33 of the base is a cantilever stage 41 which includes the temperature regulated surfaces 15 and 17, these surfaces being thus located forwardly of the apparatus so as to render them easily accessible and, as can be seen in FIGURE 3, slightly forwardly of an extension of the longitudinal axis of the receptacle 23. The stage 41 includes a platform 43 having side-by-side openings to receive the surfaces 15 and 17. A skirt 45 depends from the forward and side edges of the platform and includes a rearward edge which abuts the front wall 33 of the base to provide support for the stage 41.

Carried on the forward portion of the border frame 27 of the base 13 is relatively large plate 47, the upper face of which defines the larger chilled surface 21 previously referred to and upon which a plurality of molds 19 can be placed to complete the solidification of paraffin therein after such solidification has been initiated on the smaller chilled surface 15. The plate 47 is supported adjacent its side edges by the side walls 29 of the frame 27, and is essentially horizontally disposed except for its rearward edge which is turned downwardly to provide a back wall 49 engageable by a low temperature face of each of a pair of thermoelectric modules 51, soon to be described. The modules withdraw heat from the plate so as to chill the upper surface thereof and, preferably, the space beneath the plate is filled with in insulating material (not shown) such as a polyurethane foam to increase the effectiveness of the chilling of the plate.

When the molds are placed upon the plate 47, they may be chilled directly by conduction through the bottom wall of the mold or, alternatively, the plate may carry a pool of water or other liquid so as to permit the withdrawal of heat through a portion of the side walls of the mold as well as through the bottom wall. To accommodate such a pool of liquid, a fluid-impermeable curb 53 encircles the periphery of the upper surface of the plate and is supported on its side and forward edges by the upper edges of the side and front walls of the base frame 27. The rearward portion of the curb rests upon the plate itself and is supported thereby. Strips 55 secured to the lower surface of the plate adjacent the side and forward edges thereof engage the lower surface of the curb to provide a liquid-tight seal between the plate and curb.

The chilled surface 15 of the stage 41 is defined by one face of a bracket 57 which includes a pair of upwardly directed arms 59 and 61 offset outwardly adjacent their upper outer ends so as to provide a pair of generally horizontally disposed flanges 63 and 63. One of the flanges 63 is secured to the lower surface of the large chilled plate 47 while the other flange 65 occupies an opening in the platform 43 adjacent the front wall 33 of the base. The upwardly direced face of the flange 65 defines the chilled surface 15 and is cooled by conduction through the large plate 47 to the thermoelectric modules 51. The dimensions of the surface 15 are only slightly greater than those of the bottom wall of the largest mold which is intended to be used with the device and the surface is intended to support one mold at a time. Insulation 66 separates the flange 65 from the platform 43.

Accordingly, it will be seen that both the large plate 47 which defines the chilled surface 21, and the bracket 57, a portion of which defines the chilled surface 15, are cooled by the thermoelectric modules 51. The technician may therefore initiate the solidification of the paraffin within a mold on the surface 15 and then transfer the mold to the surface 21 where the solidification will be completed. A wide range of temperatures below ambient can be obtained for each surface through the use of the thermoelectric modules, lower temperatures of course requiring the use of larger modules having a greater capacity and surface area. When a pool of water is provided on the surface 21, the temperature of the surface should not be low enough to cause the water to freeze, and a temperature of approximately 40° F. has been found to be satisfactory.

The heated surface 17 is provided to enable the technician to reliquefy paraffin which has solidified within the mold, and also may be used to support the mold while the orientation of the specimen is being accomplished. The surface 17 is defined by the upper wall of a rectangular block 67 which contains resistance heating elements (not shown) connected by suitable conductors 69 to an electrical power source (not shown) located in the rearward portion of the apparatus. The upper surface of the box 67 is preferably maintained at a temperature sufficient to quickly melt the paraffin or other thermoplastic material contained in a mold supported on the surface 17, a temperature of 230° F. having been found to be satisfactory. The periphery of the block is spaced from the platform by insulation 70.

As previously mentioned, the plate 57 and the bracket 57 are chilled by means of the thermoelectric modules 51 (FIGURES 2 and 3), these modules being in the form of rectangular blocks which are disposed with their low temperature faces in engagement with the back wall 49 of the plate 47. The modules are connected to a source of direct current which is preferably supplied by rectifiers (not shown) connected through a transformer (not shown) to any available alternating current source.

The thermoelectric modules 51 perform most effectively when heat is withdrawn from their high temperature face and, in the illustrated embodiment, this is accomplished by a heat sink 71 through which air is circulated. Seen most clearly in FIGURE 4, the heat sink is preferably formed of a metal having a high thermal conductivity and comprises a relatively narrow hollow box which includes side walls 73, a back wall 75, a front wall 77, and a top wall formed by a grill 79 (FIG. 3). The front wall 77 is in contact with the high temperature face of each module 51 and withdraws heat therefrom by conduction. The grill 79 of the top wall includes a pair of horizontally spaced plates 81 having rods 83 extending therebetween. When metallic rectifiers are used to supply the direct current for the thermoelectric modules, they are preferably supported on the plates 81 so that they will be cooled by air passing through the grill.

In the operation of the heat sink, air is forced inwardly through the front wall 77 and outwardly through the grill 79 forming the top wall so as to provide for a continuous circulation of air through the sink. Accordingly, the back wall 75 is provided with a pair of horizontally spaced openings 85 adjacent the lower edge thereof, which openings are covered with a grill 87, as seen in FIGURE 4. A duct 89 (FIG. 2) extends outwardly from the back wall 75 in surrounding relation to each other of the openings 85 and is connected to the exhaust of the fan 91. The intake of each fan 91 is connected by means of curved tubular members 93 to a screened opening in the rear wall 31 of the base frame. The tubular members insure that air at room temperature rather than heated air from within the apparatus will be circulated through the heat sink.

The rearward portion of the base 13 of the apparatus, including the various operating components such as the heat sink 71 and fan 91 which are supported on the bottom wall 37, are enclosed by a housing 95 which includes a back wall 97, side walls 99, and a top wall 101. The forward portion of the housing 95 is closed with a glass or plastic plate 103 held in place by a molding 104 which is secured to the forward edge of the top and side walls 101 and 99 of the housing. The glass plate carries switches 105 which control the various electrical systems of the device, referred to in greater detail shortly.

The upper wall 101 of the housing 95 carries a forwardly and upwardly extending beam 107, to the outer end of which the receptacle 23 for molten paraffin is supported. The beam 107 has a hollow tubular conduit 109 extending longitudinally therethrough which carries various conductors (not shown) supplying current to a heating element 111 within the receptacle 23 and also to a solenoid assembly 113 which controls the valve 25, as hereinafter described.

The receptacle 23, supported at the upper end of the beam 107, comprises a generally frusto conically-shaped body having a removable nipple 114 at its narrow lower end held in place by a machine screw 116 and defining the orifice 24. The receptacle defines a reservoir 115 having a depth of approximately two-thirds the height of the receptacle, and is provided with a hinged lid 117 to permit the paraffin supply within the cavity to be easily replenished. Preferably, the lid is transparent so that the level of the supply may be visually noted.

The walls of the receptacle 23 have molded therein the resistance heating element 111 which is in the form of a rod extending from the upper edge of the receptacle adjacent the beam 107, downwardly to below the lower wall of the reservoir 115 where it forms a loop, and then upwardly to a point again adjacent the beam 107. A thermostat 119 is provided at the ends of the resistance heating element 111 to control the temperature thereof.

The valve 25 is located at the lower end of the receptacle 23 and serves to regulate the flow of paraffin from the receptacle to molds 19. In the illustrated embodiment, the valve is operated by the solenoid assembly 113 which in turn is controlled by the foot switch 26. The technician thus has both hands free for the manipulation of the molds.

More specifically, the body of the side wall of the receptacle underlying the reservoir 115 is provided with a channel 121 which extends downwardly from the lower wall of the reservoir into communication with an L-shaped channel 123 in the cap 114, which latter channel is angularly disposed and provides communication between the channel 121 of the body and a chamber 125 located on the longitudinal axis of the receptacle and defined partially by each the cap 114 and the receptacle body. Accordingly, the paraffin melted within the receptacle by the heat of the element 111 flows downwardly from the reservoir 115 through the channels 121 and 123 into the chamber 125.

The upper surface of that portion of the cap 114 which defines the chamber 125 is formed so as to provide a valve seat 127. More specifically, the upper surface is provided with a shallow cavity 129, the periphery of which is encircled by an upstanding flange 131. A discharge passageway 133 extends from the cavity 129 downwardly through the nozzle 118 for the dispensing of the paraffin.

The shallow cavity 129 and assageway 133 are sealed by a plug 135 which seats on the upper edge of the circular flange 131. A post 137 projects upwardly from the upper face of the plug and is encircled by the solenoid assembly 113 disposed above the chamber 125 and separated therefrom by a shield 139. A coil spring 141 interposed between the shield 139 and plug 135 biases the plug into a sealing position.

As has already been mentioned, the valve 25 is operated by the foot switch 26 which controls the flow of current to the solenoid assembly 113. Accordingly, when the switch is closed, current flows through the windings of the assembly, causing the post 137 and, hence, the plug 135 to be raised, thus permitting the paraffin to flow outwardly through the passageway 133 of the orifice 24. When the switch 26 is opened, the biasing spring 131 causes the plug to be reseated in sealing relation to the passageway.

While various electrical systems may be employed in the apparatus 11, it is preferable that a circuit be provided in which the flow of current through the heating element 111 of the receptacle 23 can be controlled separately from the flow of current to the thermoelectric modules. In this manner, the paraffin within the receptacle can be maintained in a liquid state for substantial periods of time, so that a supply of such material is always available, while the thermoelectric modules need only be operated when the apparatus is being used for a molding operation, thus conserving electricity and rendering the apparatus more economical to operate.

One method of utilizing the apparatus 11 is illustrated in FIGURES 5 through 9 in which a mold 19 such as that disclosed in McCormick U.S. Patent No. 2,996,762 is used. Very generally, this mold comprises a base 143, preferably formed of a metal, and a ring 145 which seats upon the base 143 to form part of the mold and which remains attached to the paraffin block after the base is removed to facilitate the mounting of the paraffin block in a microtome.

Initially, the technician partially fills a base 143 with paraffin dispensed from the receptacle 23 through the orifice 24 by operation of the foot switch 26 (FIG. 5). The base 143 is then placed on the heated surface 17 and a specimen is placed in the mold and oriented into a desired position (FIG. 6).

After the desired orientation is achieved, the mold is transferred to the chilled surface 15 (FIG. 7) to initiate a solidification of the paraffin. This initial solidification can be accomplished in a short period of time due to the low temperature of the surface 15 and the rapid withdrawal of heat from the mold made possible by the use of a metal base, and the technician is thus able to orient the specimen with precision at the exact moment of solidification.

If, after the solidification has been initiated, as indicated by a layer of solidified paraffin adjacent the bottom wall of the base, the orientation of the specimen is found to be unsatisfactory, the mold may be returned to the heated surface 17 whereupon the paraffin is reliquefied and the orientation can be reaccomplished.

When the desired orientation has been achieved and the solidification of the paraffin initiated, a ring 145 is placed on the base 143 and more paraffin is added (FIG. 8). The mold is then transferred to the surface 21 of the plate 47 (FIG. 9) for the completion of the solidification, during which time the molding of additional specimens in other molds can be undertaken in a manner similar to that described above.

It should be appreciated that the apparatus 11 represents a decided improvement in the embedding of specimens in a thermoplastic material such as paraffin. The apparatus is compact, convenient to use, capable of rapidly solidifying the paraffin within the mold, and of making possible orientation and reorientation of the specimen as the paraffin solidifies. The apparatus is economical of operation and makes possible the molding of specimens in much less time, thereby rendering the molding operation itself more economical.

While various of the structural features of the invention have been shown and described, it should be apparent that various modifications may be made therein without departing from the scope of the invention.

What is claimed is:

1. An apparatus for use in a system for preparing a specimen for sectioning on a microtome or the like, in which system the specimen is submerged in a liquid thermoplastic material contained in a hollow mold and the liquid thermoplastic material is subsequently caused to become solidified so as to embed the specimen therein, which apparatus comprises a base defining a pair of side-by-side temperature-regulated surfaces on which a mold may be placed, means for maintaining one of said surfaces at a temperature sufficiently above ambient to maintain a thermoplastic material contained in a mold supported on the said one surface in a liquid state so that orientation of a specimen submerged in the thermoplastic material may be accomplished, and means for maintaining the other of said surfaces at a temperature sufficiently below ambient so as to rapidly initiate the solidification of a thermoplastic material contained in the mold supported thereon while the desired orientation of the specimen is maintained.

2. An apparatus for use in a system for preparing a specimen for sectioning on a microtome or the like, in which system the specimen is submerged in a liquid thermoplastic material contained in a hollow mold and the liquid thermoplastic material is subsequently caused to become solidified so as to embed the specimen therein, which apparatus comprises a base, a hollow receptacle supported on said base and adapted to contain a quantity of the liquid thermoplastic material, a wall of said receptacle defining an orifice for dispensing the liquid thermoplastic material contained therein into a hollow mold, means on said base defining a surface engageable by the hollow mold containing the specimen and the liquid thermoplastic material, and means supported by said base for maintaining the temperature of said surface sufficiently below ambient to enable heat to be rapidly withdrawn from the mold and thermoplastic material through said surface so as to effect a solidification of the thermoplastic material.

3. An apparatus for use in a system for preparing a specimen for sectioning on a microtome or the like, in which system the specimen is submerged in a liquid thermoplastic material contained in a hollow mold and the liquid thermoplastic material is subsequently caused to become solidified so as to embed the specimen therein, which apparatus comprises a base defining a pair of side-by-side temperature-regulated surfaces on which a mold may be placed, electrically energized means on said base for maintaining on one of said surfaces at a temperature sufficiently above ambient to maintain a thermoplastic material contained in the mold supported on the said one surface in a liquid state so that orientation of a specimen submerged in the thermoplastic material may be accomplished, means on said base for maintaining the temperature of the other of said surfaces sufficiently below ambient to rapidly initiate the solidification of the thermoplastic material contained in a mold supported thereon while the desired orientation is maintained, a hollow receptacle supported by said base in elevated relation thereto adapted to contain a quantity of thermoplastic material, heating means on said receptacle for maintaining the thermoplastic material in the receptacle in a liquid state, means on said receptacle defining an orifice for dispensing of the liquid thermoplastic material from the receptacle into a hollow mold, and a valve on said receptacle for controlling the flow of liquid thermoplastic material through said orifice.

4. An apparatus for use in a system for preparing a specimen for sectioning on a microtome or the like, in which system the specimen is submerged in a liquid thermoplastic material contained in a hollow mold and the liquid thermoplastic material is subsequently caused to become solidified so as to embed the specimen therein, which apparatus comprises a base defining a pair of side-by-side temperature-controlled relatively small surfaces on which the mold may be placed, means on said base for maintaining the temperature of one of said surfaces sufficiently above ambient to maintain a thermoplastic material contained in the mold supported on the said one surface in a liquid state so that orientation of a specimen submerged in the thermoplastic material may be accomplished, means on said base for maintaining the temperature of the other of said surfaces sufficiently below ambient to rapidly initiate the solidification of the thermoplastic material contained in the mold while the desired orientation is maintained, said base also defining a relatively large surface adapted to receive and support a plurality of molds containing thermoplastic material the solidification of which has been initiated, means for maintaining said relatively large surface at a temperature appreciably below ambient, a hollow receptacle supported by said base in elevated relation thereto adapted to contain a quantity of thermoplastic material, means on said receptacle for maintaining the thermoplastic material within said receptacle in a liquid state, means defining an orifice in a wall of said receptacle for the dispensing of the liquid thermoplastic material from the receptacle into a hollow mold, and a valve on said receptacle for controlling the flow of liquid paraffin through said orifice.

5. An apparatus for use in a system for preparing a specimen for sectioning on a microtome or the like, in which system the specimen is submerged in a liquid thermoplastic material contained in a hollow mold and the liquid thermoplastic material is subsequently caused to become solidified so as to embed the specimen therein, which apparatus comprises a base including a plate defining a large first surface adapted to support a plurality of molds, a thermoelectric module having a low-temperature face and supported by said base adjacent said plate with the said low-temperature face in thermally conductive engagement with the said plate so as to chill the said plate, a bracket in thermally conductive engagement with said plate so as to be chilled thereby and extending therefrom, a portion of said bracket providing a second chilled surface adapted to support a single mold so as to initiate the solidification of the thermoplastic material contained in the mold, means disposed adjacent said second chilled surface defining a third surface adapted to support a single mold, electrically energized means for heating said third surface to a temperature sufficient to maintain a thermoplastic material contained in a mold supported therein in a liquid state so that orientation of a specimen submerged in the thermoplastic material may be accomplished, an arm affixed to and extending upwardly from said base, a hollow receptacle supported by said arm in suspended relation above the said base, said receptacle being adapted to contain a quantity of thermoplastic material, means on said receptacle for maintaining the thermoplastic material in said receptacle in a liquid state, means on said receptacle for defining an orifice for the dispensing of the liquid thermoplastic material from the receptacle into a hollow mold, a solenoid-operated valve on said receptacle for controlling the passage of the thermoplastic material through the orifice, and a foot-operated switch electrically connected to said valve for remotely controlling the operation of the valve.

References Cited by the Examiner

UNITED STATES PATENTS

| | | | |
|---|---|---|---|
| 1,797,694 | 3/1931 | Ott | 269—7 X |
| 2,629,230 | 2/1953 | Turner | 269—7 X |
| 2,937,437 | 5/1960 | Cole et al. | 269—7 X |
| 3,083,002 | 3/1963 | Lacey | 269—7 |
| 3,128,090 | 4/1964 | Anderson | 269—7 |
| 3,187,444 | 6/1965 | Lehmann | 269—7 X |
| 3,218,896 | 11/1965 | McCormick | 269—7 X |
| 3,234,595 | 2/1966 | Weichslbaum et al. | 18—5 |

J. SPENCER OVERHOLSER, *Primary Examiner.*

W. L. McBAY, *Assistant Examiner.*